Aug. 10, 1937.  L. L. SCHAUER ET AL  2,089,228
COMBINATION DRILLING AND TAPPING CONTROL
Filed Feb. 8, 1936    2 Sheets-Sheet 2
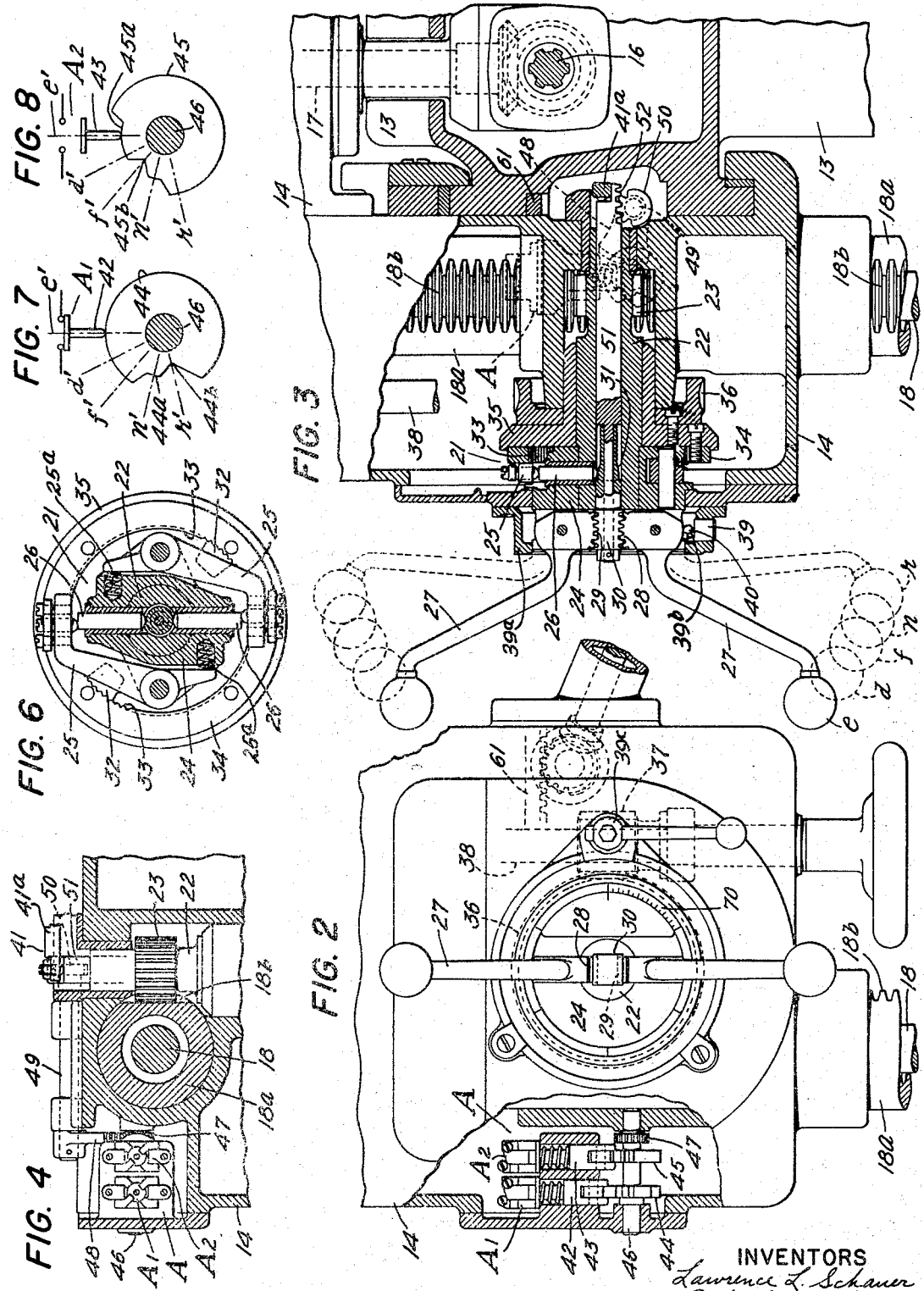
INVENTORS
Lawrence L. Schauer
John H. McKewen
BY
Albert F. Nathan
ATTORNEY Patented Aug. 10, 1937

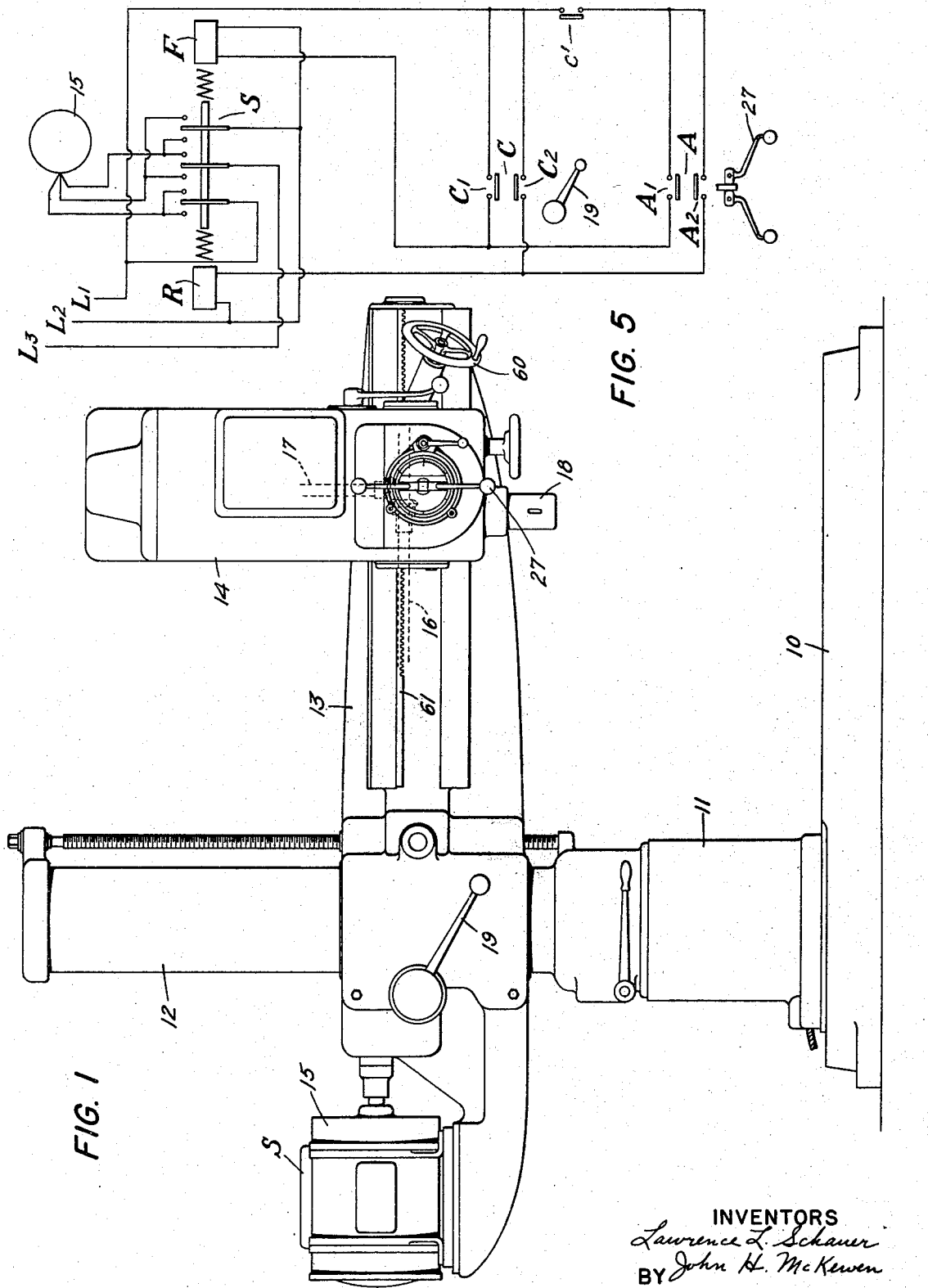

2,089,228

UNITED STATES PATENT OFFICE 2,089,228

COMBINATION DRILLING AND TAPPING CONTROL

Lawrence L. Schauer, Wyoming, and John H. McKewen, Cincinnati, Ohio, assignors to The Cincinnati Bickford Tool Company, Cincinnati, Ohio, a corporation of Ohio Application February 8, 1936, Serial No. 63,004

14 Claims. (Cl. 10—136)

This invention relates to machine tools and has for its general object to bring under control of one lever a plurality of machine tool movements, particularly the rotary and translatory movements between the tool and work in such machines.

The invention has been disclosed herein in connection with a drilling machine, for in such a machine, it possesses a number of distinct advantages not heretofore obtained in machines of conventional design.

Drilling machines are frequently used for tapping and thread cutting operations, but not however, upon an efficient production basis primarily for the reason that the operator is unable to expeditiously coordinate the rotary movements of the spindle with the translatory movements thereof with that nicety in precision essential in the cutting of threads. The large majority of threading operations are made up of a range of tap leads and sizes with respect to which there are no corresponding speeds and feeds in the machine, and it is in the cutting of threads in this wide range that the operator experiences great difficulty in the operation and control of the ordinary drilling machine.

For traversing the spindle of the machine the conventional drilling machine is usually provided with a pair of "quick traverse" levers upon the drill head, connected directly to the spindle feed pinion shaft. The levers have a pivotal mounting and are so arranged that angular movement thereof translates the spindle, and in an out movement disengages and engages a power feed clutch. In this way the spindle may be fed by hand or by power. The rotary movements of the spindle have heretofore been controlled by an independently operable mechanical reverser operative selectively in a forward or reverse direction through the medium of an additional control lever. For ordinary drilling operations, the separate lever and reverser was used primarily as a starting and stopping means for the spindle, and in rare cases the lever and reverser was used for starting, stopping, and reversing the spindle, as in tapping, the operator, in the meanwhile, having his other hand upon the quick traverse lever and periodically engaging and disengaging the power feed clutch.

This mode of operation, it will be seen, required not only the operation of two hand levers in proper sequence, but a rotary and in and out movement of the quick traverse lever, also in proper sequence, and in consequence left neither hand of the operator free to locate the work with respect to the tool or to relocate the tool in a different position. For example, each time a hole was tapped the operator had to bring the tap to rest in an elevated position and thereafter adjust the drill head or the workpiece to the new position, make two or three trial strokes of the spindle to check alignment, then finally bring the spindle down close to the work, throw in the power feed and then engage the power drive. In consequence, a large amount of time was consumed in getting the machine ready for a relatively short tooling operation.

The present invention has for a primary object, to reduce the idle time or set up time of the operation to its very minimum and to increase the machine's efficiency and productive capacity. And as a further object to render a conventional drilling machine available for all high speed tapping operations, and to achieve those ends whether the tap lead has a corresponding built in spindle feed or not.

Another objective of the present invention is to eliminate the need for costly mechanical reversing mechanisms heretofore used, and all of their controlling instrumentalities such as levers and interlocks, and by so doing reduce the initial cost of the machine, as well as all future expense incidental to the maintenance of a mechanical reverser and its associated mechanisms.

Still another object of the invention is to simplify the spindle control of a drilling machine and to bring under control of one lever all motions imparted to a tool spindle, thereby to avoid confusion in operating the machine and to permit the operator to have at least one hand free for the purpose of mounting or steadying a workpiece, or for relocating the piece relative to the spindle.

In accomplishing the ends sought by this invention it is proposed to use a reversible prime mover and to arrange the mechanism of the tool head and its cooperating mechanism in such manner that by giving the quick traverse lever two additional movements the spindle drive may be started, stopped, or reversed electively, without interfering or altering the lever's normal functions of traversing the spindle and operating the power feed clutch. The two additional movements of the lever, and the controlling mechanisms operated thereby are so coordinated with other movements of the lever that the operator is assured that each time the power feed clutch is engaged, for ordinary drilling operations, the spindle runs in the proper direction. And when the lever is moved to a spindle stop position, well beyond the point of disengagement of the power feed clutch, it may be moved either way to cause the spindle to run forwardly or reversely. Throughout all of these movements the lever retains full control of all manually effected translatory movements of the spindle, and the spindle, may, therefore, be moved up or down while rotating in either direction. This is of particular advantage in certain machining operations where it is necessary to propel the spindle forward while it is rotating in the reverse direction and conversely.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 illustrates a radial drill embodying principles of the present invention.

Fig. 2 is a front elevational view of a portion of the drill head, partly broken away to show certain control switches and their actuating means.

Fig. 3 is a vertical section through the spindle feed pinion shaft.

Fig. 4 is a horizontal sectional view of a portion of the mechanism shown in Fig. 3.

Fig. 5 is a schematic diagram of a wiring circuit.

Fig. 6 is a vertical section through the power feed clutch.

Figs. 7 and 8 are detail views of the switch actuating cams in relative phase relation.

Referring more particularly to Fig. 1 of the drawings, a conventional radial drill is represented as typical of a machine particularly adapted for the present invention. In general the machine includes a base 10, an upright column 11, a sleeve 12 rotatable on the column, an arm member 13 translatable on the column, and a drill head 14 translatable upon the arm. A reversible motor 15 also mounted upon the arm transmits power to an arm shaft 16, thence through shaft 17 to feed and speed change gearing in the head 14 to the spindle 18. A lever 19, mounted upon the arm, is used for operating an arm clamping mechanism and for controlling elevating and lowering movements, and is so constructed and related to spindle controls upon the head that the operator has no control over spindle movements unless the arm is clamped to the column.

Apart from the reversible motor feature and the dual functioning of the arm clamping and elevating control feature, the foregoing generalities are common to most drills of this character, and further description of such details are believed unnecessary.

Figures 2, 3, and 4 illustrate more clearly the relation of the quick traverse levers 27, power feed clutch 21, feed pinion shaft 22, and the tool spindle 18. The spindle 18 is rotated through a train of change speed gearing (not shown) direct from the arm shaft 16 in any position of the head upon the arm. A non-rotatable sleeve 18a journals the spindle and by which it is translated toward or from the work by means of rack teeth 18b on the sleeve and a pinion 23 on the feed pinion shaft 22.

The pinion shaft 22 extends forward to the front of the drill head 14 and carries a traverse head 24 which in turn carries clutch levers 25 and spreader pins 26. The quick traverse levers 27 have a transverse pivotal mounting in the head 24 and are provided at their inner ends with gear segment portions 28. These gear portions engage complemental teeth 29 formed upon a tripping bar 30, located centrally of the pinion shaft, and which is provided with inclined cam surfaces 31. The cam surfaces 31 coact with the spreader pins 26 in moving the levers 25 to clutch engaging position. Each lever has laterally offset notched portion 32 adapted to engage complemental notches 33 formed upon an inner periphery of a clutch ring 34. The ring 34 is secured to one side of a flanged member 35 rotatably mounted upon the pinion shaft 22, which member also has secured thereto a worm wheel 36. Normally the wheel 36 is constantly rotated by a worm gear 37 secured to a feed shaft 38, which is the ultimate element in the power feed train. It will be understood that the feed shaft 38 is driven through a change speed mechanism (not shown) in the drill head 14, deriving power initially from the spindle so that the preselected ratio of feed to speed will be maintained.

When the quick traverse levers 27 are in the full line position shown in Fig. 3, the cam or trip shaft 30 is moved to the right so that the spreader pins 26 ride upon the high part of the shaft. In this position the clutch levers 25 are expanded into engagement with the ring 34 thereby connecting the worm wheel 36 to the feed pinion shaft 22 and the spindle is propelled by power. When the spindle has moved a given distance, predetermined by the setting of an adjustable but normally stationary depth dog 39, the dog 39 engages a projection 40 on one of the levers 27 and moves same to a position whereat the spreader pins 26 ride upon the low portion of the cam shaft 30. The clutch levers 25, actuated by springs 25a, automatically disengage themselves from the ring 34 and the wheel 36 runs free thereby stopping the power feed. The dog 39 is mounted in an angularly adjustable but normally stationary ring 39a, and is provided with a cam surface 39b that lies in the plane of rotation of the part 40 when the latter is moved to a position corresponding to position e of lever 27. The ring 39a may be clamped to the drill head 14 in the required position by a manually operable clamp 39c.

An auxiliary safety power feed throw-out is provided by the mechanism indicated generally at 41. Such a mechanism is disclosed more clearly in Patent No. 1,976,945, and comprises in its essentials a pivoted lever 41a, one end of which contacts with the end of the cam shaft 51, and the other end of the lever engages a secondary axially movable shaft that projects into the path of movement of fixed limit-dogs carried by or operated by the spindle sleeve. When the spindle has traveled its full distance, one of the dogs shifts the secondary shaft, which in turn rocks the lever 41a about its pivot and shifts the cam shaft 51 to the left, thus disconnecting the power feed automatically when the spindle reaches its limit of travel.

The clutch disengaged position of the levers 27 is illustrated by the position marked d in the drawings and when in that position the spindle may thereafter be raised or lowered by an angular movement of the levers 27.

As hereinbefore stated, an object of this invention is to place the control of the spindle rotating means under the same quick traverse lever so that an operator may control all movements of the spindle with one hand. In the present disclosure this is accomplished by incorporating a reversible motor 16 in the drive train remotely controlled by reversing switches mounted in the drill head 14.

The reference character A, represents the control switch generally, which is made up of a normally open forward switch A1 and a normally open reverse switch A2, each operated by a plunger 42 and 43 respectively. The lower ends of the plungers are provided with rollers maintained under spring pressure in engagement with the peripheries of cams 44 and 45 on a shaft 46. The shaft 46 carries a small gear 47 that meshes with the teeth of a segment gear 48 on a shaft 49. The latter shaft extends toward the center of the drill head and carries a pinion 50 that underlies the feed pinion shaft 22.

In order to actuate the pinion 50, the cam shaft 30 is provided with a non-rotatable extension 51 formed with gear teeth 52 at one side and normally meshing with the teeth of the pinion 50. Accordingly, in and out movement of the tripping shaft 30, 51 effects rotation of the switch operating pinion 50, whereas rotation of the cam portion 30, etc., does not change the angular position of the switch actuating shafts 46 or 49.

In order that the normal in and out movement of the lever 27 (positions e—d) for the purpose of disengaging or engaging the power feed clutch 21, will have no effect upon the switches A1 or A2, the actuating cams for the latter are required to have a definite configuration. Figs. 7 and 8 illustrate the switch cams 44 and 45 in their relative angular positions, with both cams rotated to the positions they assume when the hand lever 27 is in power feed position e. In this position the switch plunger 42 rides upon the periphery of cam 44, thus closing the forward switch A1 and the spindle is turning in a forward direction. Plunger 43 is riding upon a step 45a of the cam 45 and the reverse switch is "open". Movement of the traverse lever 27 to its clutch disengaged position (d) rotates the cams 44 and 45 slightly but the switches remain positioned as before.

Movement of the traverse lever to the position f rotates the cams 44 and 45 further, which causes plunger 43 to drop into a detent 45b which acts as a yieldable lock for the switches in that position. The forward switch plunger is still riding upon the "high" part of cam 44 and the spindle is running forward. In this position the operator may manually propel the spindle forward or backward by turning the levers 27 angularly.

To stop the spindle from turning, the lever 27 is given a further movement "in" to a position n wherein both switch plungers 42 and 43 are riding upon steps 44a and 45a of the cams. In this position both switches A1 and A2 are open and the spindle is stopped.

Reversing the spindle is effected by moving the traverse lever 27 to the position r which, through the rack and gear connections mentioned, rotates the cams 44 and 45 still further. Forward switch plunger 42 now drops into a detent 44b, while reverse switch plunger 43 rides on the periphery of cam 45. Forward switch A1 is, accordingly, "open" and reverse switch A2 is closed, and the spindle runs in the reverse direction. The reverse movement of the traverse levers 27 reverses the sequence of the above operations, the positions indicated by the letters e', d', f', n', and r' corresponding to the positions of the quick traverse lever 27.

For ordinary drilling operations, the operator uses the quick traverse lever 27 in positions d and e, the former position being assumed to rapidly bring the spindle down to the work and the latter to engage the power feed, and in either position the lever is held by ordinary friction and by the lands at each side of the cams 31 on the trip shaft 30. When the drill has fed the required distance, dog 39, or the operator trips out the power feed by moving the lever to position d. In drilling, the spindle is never reversed, first because there is no need for it and second, because the spiral flutes of a drill, if driven reversely, cause the chips to bind which scores the work and draws the temper of the drill.

To use the machine as a high speed tapper, the operator moves the lever to position n, chucks the proper tap in the spindle, and locates the workpiece thereunder. Then with one hand upon the lever 27 he moves it angularly to bring the spindle to the workpiece and then gives the lever a slight outward movement to the position f. The outward movement of the lever closes the forward switch A1 and the spindle turns in a forward direction. Further angular movement of the lever feeds the tap into the hole and after one or two threads have been cut, under the urge of the operator, the tap feeds itself the rest of the way. When the tap has cut the required number of threads, which the operator may determine either by watching the tap itself or by watching the depth dial 70, the operator gives the lever a quick movement inwardly to the position r.

In the position r, the reverse switch A2 is closed and the forward switch A1 opened, and immediately the spindle reverses its movement and the tap automatically feeds itself out of the hole. The operator all the while has one hand on the lever 27 and as soon as the tap clears the hole a slight oscillatory movement of the lever retracts the spindle a distance sufficient to permit shifting of the work or drill head to the next position.

The relocating operation, is with this invention effected by the operator's other hand which all the while may be grasping the workpiece or the head traversing wheel 60, for that purpose. The head traversing wheel 60, as shown in dotted lines in Fig. 2, is geared to an arm rack 61, whereby rotation of the wheel quickly adjusts the head along the arm. Some operators prefer to leave the sleeve 12 unclamped from the column 11, so that the shifting of the head may, when necessary, be accompanied by a swinging movement of the arm and thus expeditiously locate the tap, and for the further purpose of allowing the tap to float itself into the hole.

The operator then repeats the movements of the lever 27, that is, moves the lever out to position f and simultaneously down to perform the tapping operation.

By this method of control, it will be seen that there are no idle or unnecessary movements of the operator in his exercise of complete control of the spindle, there are no additional levers to operate and the result is the expeditious performance of a single or a succession of tapping operations.

Should the operator desire, or should it become necessary to stop the spindle at any point, that may be done by moving the lever 27 to the position n. This position opens both switches A1 and A2 and rotary movements cease. If the machine is drilling, under power feed, the movement of lever 27 to position n stops both feed and speed simultaneously.

It is important here to note that the reversing control mechanism above explained is so arranged that the positions of the lever for controlling direction of spindle movement are all beyond the point of full disengagement of the power feed clutch 21 so that there is no danger of rendering the power feed effective when the user merely wants to start the spindle forward, as in tapping. On the other hand, the present arrangement insures that when the power feed is engaged the spindle will first be running and always in a forward direction for drilling.

The extreme simplicity of the design, and the fewness of the parts required, make this type of control foolproof in operation and very serviceable and reliable over extended periods of usage. Only one lever is employed for the control of all spindle motions, and being directly connected with each of the elements actuated thereby, there are no parts to get out of time and likely to cause incompatible movements. The operator, by this invention, is given a full and complete finger tip control over both rotary and axial movements of the spindle through a single lever.

In Fig. 5 of the drawings, a diagrammatic drawing of an electrical control circuit for the prime mover 15 is illustrated. This circuit includes a solenoid operated main reversing switch S in which two solenoids R and F control the starting, stopping and reversing of the prime mover. When one solenoid is energized the motor runs in one direction, when the other is energized the motor runs in the opposite direction, and if neither is energized the motor stops.

Switches C and A illustrated in the diagram control the solenoid circuits, the switch C being actuated by the column clamping and elevating control lever 19 and the switch A by the traverse lever 27. Briefly, the lever 19 may actuate the reversing switch C only when the lever is in the arm unclamped position, and in that position the cut-out switch c' is open and the operator has no control over spindle rotation at the lever 27. When switch C1 is closed the prime mover 15 propels the arm "up" and when switch C2 is closed the arm is propelled "down", but in either movement the switch c' is open, and it is only when the arm is clamped (switches C1 and C2 open) that the switch c' is closed and the operator has control of the spindle movements at the head. Inasmuch as the present invention concerns primarily the control of the spindle through the lever 27, further description of the lever 19 and its functions, has been omitted in the interest of clarity.

From the foregoing it will be seen that the elimination of the expensive reversing mechanisms heretofore used, not only greatly reduces the initial cost of the machine but likewise reduces the maintenance cost, since the direct drive from motor to spindle requires no subsequent adjustment or attention. The usual controls for such reversing mechanisms have also been eliminated together with all of their mechanical interlocks, which again are a frequent source of trouble.

The machine structure as a whole is greatly simplified by the coordination of the spindle rotating control with the spindle traversing control, accomplished in a manner which permits instant use of the machine for either type of work without the necessity of operating auxiliary cutouts, buttons, levers, etc., in order to render the control available.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, we claim as new and desire to secure the following combinations and elements, or equivalents thereof, by Letters Patent of the United States:—

1. A control for the rotary and translatory movements imparted to a spindle of a machine tool having a rotatable and translatable spindle, comprising a hollow pinion shaft for translating the spindle; a control lever pivoted to one end of the shaft for rotating the shaft angularly thereby to translate said spindle; an axially movable element within said shaft, said element having an operative connection with said lever whereby movement of the lever on its pivot shifts said element axially; power means for rotating said spindle; reversing means for said power means including a pair of normally open control switches; means actuated by the axial movement of said element to a predetermined position to close one of said switches thereby to render said power means effective to rotate said spindle in a given direction, and means actuated by the axial movement of said element to another position to close the other of said switches thereby to render said power means effective to rotate said spindle in a reverse direction; and means operative when said lever is used as a spindle translating means for maintaining said switches in the position last moved by the axial movement of said element.

2. A drilling machine having a rotatable and translatable spindle combining power means for rotating the spindle selectively in a forward or reverse direction; a control means for said power means; a pivotally mounted and rotatable control lever for actuating said control means thereby to render said power means effective to rotate said spindle selectively in a forward or reverse direction or to stop rotation of the spindle; manual means including said lever for translating said spindle axially in either direction; and connections between said lever and said control means operative when said lever is moved about its said pivot to actuate said control means, and when said lever is moved about its axis of rotation to leave said control means in the position last moved by the pivotal movement of said lever.

3. A drilling machine combining a tool spindle; power means for rotating the spindle; power means for feeding the spindle including a power feed clutch; manual means for translating said spindle and for engaging and disengaging said clutch including a pivotally mounted lever movable angularly in a plurality of planes; means for starting, stopping and for reversing the rotary movement of said spindle, said means including said pivoted lever and connections actuated by the lever as said lever is moved selectively from one of said planes to another to cause said spindle to rotate selectively in a forward direction, in a reverse direction, or to stop rotary movement of the spindle, said lever being manually operative to translate the spindle in either direction in any of its effective positions except the position in which the said power feed clutch is engaged.

4. A drilling machine combining a tool spindle; power means for rotating the spindle; power means for feeding the spindle including a power feed clutch; manual means for translating said spindle and for engaging and disengaging said clutch including a pivotally mounted lever movable angularly in a plurality of planes; means for starting, stopping and reversing the rotary movement of said spindle, said means including said pivoted lever and connections operative when said lever is moved selectively from one of said planes to another to cause said spindle selectively to rotate in a forward direction with the power feed clutch engaged, or to rotate in a forward direction with the power feed clutch disengaged, or to rotate in a reverse direction with the power feed clutch disengaged, or to stop all rotary movement of the spindle.

5. A drilling machine combining a tool head; a tool spindle rotatably and translatably mounted therein; a quick traverse head having operative connections connecting said head directly with the spindle whereby rotary movement of the head effects axial movement of the spindle; a control lever; means pivotally mounting said lever to said traverse head member on an axis transverse to its axis of rotation whereby the operating end of said lever may be given an in or an out movement selectively simultaneously or independently of the said angular movement; power means for rotating said spindle selectively in forward and reverse directions; control means for said power means; and operative connections between said control means and said lever operative upon the in and out movement of the lever to cause said spindle to rotate selectively in a forward or a reverse direction.

6. A drilling machine combining a drill spindle; power means for translating the spindle including a power feed clutch; a manually operated element for engaging said clutch; direct acting connections between said element and said spindle for translating said spindle in either direction at any time except when said power feed clutch is engaged; reversible means for rotating said spindle; and means including said manually operated element for controlling the direction of rotary movement of said spindle and the direction of translation of the spindle and connections between said element and the mechanisms controlled thereby operative to effect rotation of said spindle in a forward direction prior to the engagement of said power feed clutch by said element.

7. In a radial drill having a translatable and rotatable tool spindle the combination of a prime mover connected with said spindle; reversing means for said mover operative to cause rotary movement of the spindle selectively in a forward or reverse direction; manual means including a hand lever for propelling said spindle axially toward or away from the work, said lever being mounted for movement in transverse planes and when moved in one of said planes to effect the said axial movement of said spindle; and operative connections between said lever and said reversing means effective to render said reversing means operative selectively in a forward or a reverse direction only when the lever is moved in a plane transverse to its plane of movement in effecting said axial movement whereby an operator may propel the spindle axially in either direction and cause same to rotate in a forward or reverse direction at any point in said axial movement through and under the control of said transversely movable lever.

8. A spindle drive and feed control for a machine tool combining a rotatable and translatable spindle, a hollow pinion shaft for translating the spindle; a control lever pivoted to one end of the shaft for rotating the shaft angularly thereby to translate said spindle; an axially movable element within said shaft said element having an operative connection with said lever whereby movement of the lever on its pivot shifts said element axially; power means for rotating said spindle; control means for starting, stopping, or reversing the action of said power means selectively; and means operatively connecting said control means with said axially shiftable element whereby movement of said element axially to a predetermined position actuates said control means.

9. In a drilling machine having a rotatable and translatable spindle the combination of power means for rotating the spindle selectively in a forward or reverse direction; of a control lever for rendering said means effective to rotate said spindle selectively in a forward or reverse direction or to stop rotation of the spindle; of power means including a power feed clutch for translating said spindle axially; of means actuated by said control lever for engaging and disengaging said power feed clutch selectively; and of means including said lever for manually feeding said spindle axially at any time in either direction and irrespective of the direction of rotation of said spindle, except when said lever is actuated to a position engaging said power feed clutch.

10. A drilling machine combining a spindle; a reversible prime mover and non-interruptable drive connections between same and said spindle for rotating the spindle; a rotatable feed pinion shaft for moving said spindle axially in a forward or reverse direction selectively; a hand lever pivoted to said shaft and movable in a plurality of planes relative to said shaft for rotating said shaft; direction control means for said reversible prime mover, comprising a pair of reversing switches and plungers for actuating same; means actuated by the movement of said pivoted lever about its pivot on said pinion shaft for actuating said switch plungers; power means for feeding said spindle including a power feed clutch; means actuated by the movement of said lever about its pivot on the pinion shaft for actuating said power feed clutch; and means rendering said switch plunger actuating means effective to cause rotation of the spindle prior to the engagement of said power feed clutch.

11. A drilling machine combining a spindle; a reversible prime mover and non-interruptable drive connections between same and said spindle for rotating the spindle; manual means for moving said spindle axially in a forward or reverse direction selectively, said means including a rotatable member and a hand lever pivotally mounted thereon and movable in a plurality of planes relative to the member for rotating the said member; operative connections directly connecting said rotatable member with said spindle; means for effecting a starting of said prime mover selectively in either direction and for stopping same comprising a set of reversing switches and rotatable cams for actuating said switches; and means actuated by the movement of said lever about its pivot on said rotatable member for actuating said switch cams to effect a starting, stopping or change in direction of motion of said prime mover, said last mentioned means being operative in any angular position of the said rotatable element.

12. A drilling machine combining a spindle; a reversible prime mover and non-interruptable drive connections between the prime mover and said spindle for rotating the spindle; manual means for moving said spindle axially in a forward or reverse direction selectively, said means including a pivoted hand lever movable angularly in a plurality of planes and direct acting connections connecting said lever with said spindle; means for effecting a starting of said prime mover selectively in either direction and for stopping same; and means actuated by the movement of said pivoted lever from one of said planes to another for actuating said means for effecting a starting, stopping or a change in the direction of motion of said prime mover, said last mentioned means being operative during the angular movement of the levers and when said lever is in any angular position.

13. A drilling machine combining a drill spindle; power means for translating the spindle including a power feed clutch; direct acting manual means connected with the spindle for translating said spindle in either direction at any time except when said power feed clutch is engaged; reversible means for rotating said spindle; means including a single control lever for controlling the direction of rotary movement of said spindle and for engaging said power feed clutch; and connections between said lever and the elements controlled thereby operative to insure the disengagement of said power feed clutch prior to effecting a reversal in rotary movement of the spindle by said lever.

14. A drilling machine combining a drill spindle; a feed pinion shaft operatively connected therewith for translating same in either direction; reversible means for rotating said spindle; control means for said rotating means; means including a single lever pivoted to said pinion shaft for rotating said shaft thereby to translate said spindle and for actuating said control means; and connections between said pivoted lever and said control means operative electively to start, stop, or reverse the direction of rotation of said spindle irrespective of the direction of translation effected through the said lever.

LAWRENCE L. SCHAUER.
JOHN H. McKEWEN.